Patented July 5, 1932

1,866,017

UNITED STATES PATENT OFFICE

EMILE C. DE STUBNER, OF ROCHESTER, NEW YORK

PIGMENTS AND PROCESS OF MAKING SAME

No Drawing.  Application filed September 23, 1926. Serial No. 137,382.

This invention relates to the manufacture of pigments and pigmented products, and has in view the saving of much of the time, labor and expense incident to the methods and practices heretofore employed in such manufacture. The invention is more particularly concerned with pigments produced as a precipitate from the reaction on each other of solutions of the precipitate-forming constituents, and the incorporation of the pigmented precipitate with the product or material to be colored, and the invention has for its main object the production of such precipitate in a form which will adapt it to be incorporated directly in the product or material to be colored, such for instance as lacquers, paints, enamels, printer's ink, etc., without the laborious, expensive and time-consuming, drying and grinding treatments which have heretofore been resorted to.

Under the practice now carried out in making pigmented precipitates (which are usually placed on the market in dry form), and incorporating them in the materials or products to be colored, there are mixed together solutions of the appropriate constituents to form the color desired, and the precipitate is separated from the solutions by filtration or by a centrifuge or similar means, leaving the precipitate in the form of a sludge or filter cake. This sludge is placed in heating ovens through which a large volume of air is blown in order to carry off the moisture, and the pigment is left in dry chunks, which are often baked together according to the temperature maintained in the drying process. These chunks are now powdered in reducing mills, such as pebble-mills, cone-mills, and the like, and the powdered pigment is subjected to frequent siftings in order to bring about uniformity in the marketed product. In incorporating this dry powdered pigment in the products or materials to be colored, such for instance as in a lacquer to color the same, the pigment is introduced into the lacquer and subjected therein to a grinding and mixing operation, in most cases occupying a period of 48 hours or more, in order to bring about that degree of fineness and intermixture of the materials which will produce a smooth colored lacquer free from particles or lumps of the pigmented precipitate. The steps in the above described procedure of drying the filter sludge and thereby forming a cake or lump, the grinding of this dried cake or lump to make it fine, and the further grinding and long continued intermixing of the fine pigment powder in the material or vehicle of the product to be colored, consumes much time and labor and results in correspondingly great expense.

Under the foregoing practice the aim of which is to ultimately bring about a sub-division of the pigment of the maximum fineness, the original fineness which was brought about in the precipitating action, is destroyed by the drying and the formation of the sludge into cakes, and necessitates in restoring the former condition of fineness, the expensive and time-consuming steps and the drying and grinding treatments above referred to.

In accordance with my invention I dispense with the formation of the filter sludge into cakes, and its subsequent grinding to reduce it to fineness, and the further grinding to incorporate it in the article or material to be colored, and I form the precipitate and treat it in such manner that it may be incorporated with the product or material to be colored by a mixture of the two, without the necessity of subjecting the same to any drying or grinding action, thereby saving the expense and time incident to such operations. Further in accordance with my invention I produce a pigment of novel form, which may be placed on the market as such, ready to be used as above described.

My invention therefore consists, insofar as this phase of the same is concerned, of a pigment of improved form, and in the process of making the same.

In the production of pigmented lacquers in accordance with my invention, the improved pigment may be introduced directly into clear lacquer and a color imparted to the lacquer in this way; or in accordance with my invention the soluble cellulosic base of the lacquer, may be first treated to precipitate the pigment thereon, thereby producing a pigmented soluble cellulose which when dissolved in a suitable solvent, will produce a pigmented lacquer, and my invention therefore consists, insofar as this phase of the same is concerned, in a pigmented soluble cellulose, and in the process of producing the same, which pigmented cellulose may be placed on the market as an article of commerce; and consists also in the process of making pigmented lacquers.

The manner of carrying out the improved processes above mentioned, and the characteristics of the improved products and articles resulting therefrom, will be described in detail in the specification to follow, and the novel features thereof pointed out in the appended claims.

In producing my improved pigment, solutions of appropriate constituents to throw down a precipitate of the desired color, are mixed together, and the precipitate resulting from the chemical reaction, is separated from the supernatant liquor solvents, by running off or siphoning the liquor, or by other suitable means. The separated precipitate is now washed in a large quantity of water, in which the precipitate is stirred for a short time, so as to get rid of the solutions of the by-products resulting from the reactions of the solutions on each other, thereby giving the precipitate the form of sludge. The precipitated sludge is next freed of adhering water, as by filtering, or by centrifuge or other mechanical means, whereby there is formed a hydrated sludge of greater stiffness than that resulting from the washing; and finally this hydrated sludge is dehydrated by adding continuously to it, a dehydrating agent miscible with water, and miscible with a constituent of the material or product with which the pigment precipitate is to be incorporated, whereby there is produced a dehydrated pigmented precipitate damp with the dehydrating agent.

The pigment thus produced may be placed on the market in this form, and may be employed to produce and color different products and materials such as lacquers, printer's ink, paints, enamels, celluloid, artificial leather, explosives, films, collodion, etc. For instance, in coloring lacquer the dehydrated pigment is mixed with clear lacquer; in making printer's ink, the precipitate would be mixed with printing-ink varnish; in making paint, it would be mixed with linseed oil, and in making enamels, it would be mixed with varnish, and so on, it being understood that in each case, the dehydrating agent should be of such nature as to be miscible with the material or product or some constituent thereof, which is to be colored or produced. For instance, where the pigment is to be employed for coloring lacquer, a suitable dehydrating agent would be alcohol; and where the pigment is to be used for making printer's ink, paints, enamels, etc., a dehydrating agent in the form of acetone or pyridin would be suitable, the point being that in dehydrating the pigment in accordance with my invention, such a dehydrating agent should be employed which will give the pigment, damp with such agent, an affinity for the material or product with which it is to be incorporated.

It will be understood that in the preparation of the pigment as above described, no drying or grinding operations are resorted to, and the fine precipitated form of the pigment in the form and fineness produced by the precipitation in the first instance, is preserved and maintained without the same undergoing any treatment tending to destroy or alter such fineness.

I will now describe a specific instance of the practice of my invention in making a yellow pigment designed to be mixed with clear lacquer to give a yellow color to the same.

In one tank is placed a solution containing 294 lbs. or thereabout of potassium bichromate of a strength of 2 to 5% or thereabout. In another tank is placed a solution of similar strength of 379 lbs. or thereabout of acetate of lead (commercially known as sugar of lead). The contents of these two tanks are mixed together, as by pouring one into the other, and due to the chemical reaction of the solutions on each other, there will result a precipitate of 320 lbs. of lead chromate in a state of exceeding fineness. This precipitate settles on the bottom of the tank, and the supernatant liquor is run off and the remaining pigmented precipitate is washed to free it of the solutions of the by-products resulting from the chemical reaction. When the washing is considered sufficient, the precipitate will be left in the form of a sludge in the bottom of the tank. This sludge precipitate is now freed of its adhering water by a filter-press or centrifuge or other suitable means, thereby giving the sludge greater stiffness. Next the sludge is dehydrated by adding to it continuously, alcohol of from 95 to 96% until the alcohol draining away shows that there is no more water present. This pigment, which may according to the character of the dehydrating treatment, be more or less damp with alcohol, is now ready to be mixed with clear lacquer, and when so mixed will impart a yellow color to the same. Due to the presence in the pigment of alcohol, the lacquer is free to take up and combine with the minutest particles of the pigment, since the alcohol is readily soluble in the lacquer.

From the foregoing description it will be understood that a colored lacquer is produced by incorporating my improved dehydrated pigmented precipitate, with clear lacquer; and the precipitate in this improved form will be placed on the market as a commercial article, and is available as such by the merchant for coloring lacquers.

My invention however contemplates the production of pigmented lacquers by a different process from that above described, whereby the soluble cellulose, the base of lacquers, is first colored by precipitating the pigment thereon, and the pigmented cellulose placed on the market in this form, so that it may be dissolved by the merchant in a suitable solvent to form pigmented lacquer. I believe a soluble cellulose, thus previously colored or pigmented, and ready to be used to produce pigmented lacquer, to be novel with me, and I will now describe the process of producing such pigmented cellulose, where it is to be used for example to make yellow lacquer, it being understood that precipitates of other colors may be applied to the cellulose by employing solutions of appropriate constituents according to the color desired.

In a tank containing a solution of acetate of lead I place washed hydrated soluble cellulose, and I introduce into the mixture, a solution of potassium bichromate. As a result, the reactions of the solutions on each other, will form a yellow precipitate of lead chromate which will settle down on the cellulose, thereby imparting a yellow color to the same. The colored cellulose is now dehydrated with a suitable dehydrating agent, such as alcohol, and the dehydrating action is regulated, so that the resulting improved cellulose will be preferably damp with the dehydrating agent. This completes the production of the pigmented soluble cellulose, and as above stated, the product in this form may be placed on the market as a commercial product. In the use of the same to form lacquer, the cellulose is dissolved in a suitable solvent such as butyl-acetate and the resulting solution will be a lacquer, in the present instance, colored yellow.

This same pigmented soluble cellulose may also be employed for making colored celluloid, artificial leather, etc., by incorporating the same by the use of suitable solvents in the material or article to be produced.

It will be understood that in the operation above described of producing pigmented soluble cellulose, the cellulose is colored by the precipitate without resorting to drying or grinding operations, and a product is formed which is ready to be dissolved to form the desired colored product.

In the foregoing description I have given specific examples of the production of mineral pigmented precipitates, but it will be understood that the invention is not limited to such, but is applicable as well to the production of metal pigmented precipitates, such as copper, silver, antimony, gold, etc. For instance, in producing a precipitate of copper, there would be placed in a suitable tank a solution of copper sulfate (commercially known as blue vitriol), and there would be immersed in this solution, iron bodies, and from the reaction resulting, a copper precipitate would be thrown down, and this copper precipitate would be treated in a manner similar to the treatment of the mineral precipitates hereinbefore specifically described, thereby resulting in a pigmented dehydrated precipitate. It will be also understood that metallic precipitate would be applied to soluble cellulose in the same manner in which the mineral precipitate was applied, viz., by placing the soluble cellulose in the metallic solution, and thereby bringing about the depositing of the metal precipitate on the cellulose.

The dehydrating agents I employ in the different examples given and for the purposes of the invention, have no affinity for the pigment, and due to this fact no compounds are formed by the contact of the dehydrating agent with the pigment in removing moisture. This is a very desirable and important feature of my invention, since the presence of such compounds in the pigment would render the pigment unsuitable for incorporation in the particular kinds of products which are to be colored in accordance with my invention.

A further characteristic of the dehydrating agents employed by me is that they are miscible with water, and also miscible with one or more of the constituents of the product to be colored. The advantages of this characteristic are that the dehydrating agent will readily combine physically with the moisture in the pigment and will thus carry away said moisture as the dehydrating agent is flowed over or through the pigment; and the pigment when incorporated in the product to be colored, will run smoothly into the same and intimately combine therewith and be uniformly distributed throughout the mass.

As before pointed out the dehydrating of the pigment by the liquid dehydrating agent is carried to such a point that the pigment will be left damp with said agent, and therefore the dehydrating agent will be largely dominated by the pigment. This will leave the pigment in the form of a pulpy mass which is the most desirable form, and by storing the same in sealed containers to prevent the evaporation of the dehydrating agent, the pigment will be preserved in damp form and prevented from caking, and will therefore be in a condition to be directly incorporated in the products to be colored without the necessity of resorting to grinding operations to effect such incorporation.

The treatment of the finely divided pigment by water, either when said pigment is produced by precipitation from solutions, or when the pigment is otherwise produced in finely divided form, effectually removes the electrical charges possessed by the pigment, since water in the process becomes a good conductor of electricity, and therefore the tendency of the pigment to conglomerate, which would follow from the presence of electrical charges, is effectually destroyed.

From what has been stated, it will be understood that the finely subdivided precipitate-like form of the pigment constitutes in its wetted condition, either when dispersed in water or when thrown down as a true precipitate, a pigment pulp in which the pulping medium, namely water at one stage of the process, is displaced at another stage of the process by a non-aqueous pulping medium having the property of dehydrating the pulp, specifically alcohol; and it will be understood that the dehydrating action is so controlled that there will be left a sufficient amount of the pulping medium to preserve the pulp form of the pigment in its finely subdivided condition, and in which the pigment will preferably dominate the pulping medium. Due to this method of treatment, the fine precipitate-like form of the pulp is never destroyed, nor is the pigment allowed ever to agglomerate; and as hereinbefore stated, such pigment pulp by being stored in sealed containers to prevent evaporation of the dehydrating pulping medium, is preserved in damp or pulpy form, and may therefore be dispersed directly into the product to be colored without the necessity of subjecting the pigment to the customary grinding or similar dispersing treatments.

Having thus described my invention, what I claim is:

1. The process of preparing pigments for incorporation directly and without grinding into the product to be colored, which consists in producing a dispersion in water of the pigment in the form of a pigment pulp in a state of fine subdivision comparable in fineness to a precipitate of said pigment, treating the pulp with a liquid medium miscible with water to dehydrate the same, and controlling the dehydrating treatment to leave a sufficient amount of said medium to preserve the pulp form of the pigment in the said state of fine subdivision; whereby the fine, precipitate-like form of the pigment is maintained, and the pigment pulp may be dispersed directly into the product to be colored, without subjecting the pigment to the customary grinding or similar dispersing treatments.

2. The process defined in claim 1, characterized by the fact that the dehydrating medium employed has no chemical affinity for the pigment.

3. The process defined in claim 1, characterized by the fact that the dehydrating medium employed is miscible also with the product to be colored.

4. The process defined in claim 1, characterized by the fact that alcohol is employed as the dehydrating medium.

5. The process of preparing pigments for incorporation directly and without grinding into the product to be colored, which process consists in producing a precipitate of the color desired, dispersing the same in water in the form of a pigment pulp, treating the pulp with a liquid medium miscible with water to dehydrate the pulp, and controlling the dehydrating treatment to leave a sufficient amount of said medium to preserve the pulp form of the pigment in its state of fine subdivision; whereby the fine, precipitate form of the pigment is maintained, and the pigment pulp may be dispersed directly into the product to be colored without subjecting the pigment to the customary grinding or similar dispersing treatments.

6. The process of preparing pigments for incorporation directly and without grinding into the product to be colored, which consists in mixing together solutions of the appropriate constituents to produce a pigment pulp precipitate of the color desired, washing the same with water, removing the excess of water from the pulp precipitate, treating the pulp after such removal with a liquid medium miscible with water to dehydrate the pulp, and controlling the dehydrating treatment to leave a sufficient amount of said medium to preserve the pulp form of the pigment in its state of fine subdivision; whereby the fine precipitate form of the pigment is maintained, and the pigment pulp may be dispersed directly into the product to be colored, without subjecting the pigment to the customary grinding or similar dispersing treatments.

In testimony whereof, I have affixed my signature hereto.

EMILE C. DE STUBNER.